United States Patent
Wolf et al.

(10) Patent No.: US 6,222,648 B1
(45) Date of Patent: *Apr. 24, 2001

(54) ON LINE COMPENSATION FOR SLOW DRIFT OF COLOR FIDELITY IN DOCUMENT OUTPUT TERMINALS (DOT)

(75) Inventors: Barry M. Wolf; Vittorio R. Castelli; Edward J. Solcz, all of Yorktown Heights, NY (US)

(73) Assignee: Xerox Corporation, Stamford, CT (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/787,524

(22) Filed: Jan. 21, 1997

(51) Int. Cl.$^7$ .................................................. H04N 1/46
(52) U.S. Cl. ............................................ 358/504; 358/501
(58) Field of Search ................................ 382/162, 167, 382/169; 358/500, 515, 518, 520, 521, 522, 523, 525, 524, 529, 530, 501, 502, 504, 505

(56) References Cited

U.S. PATENT DOCUMENTS

| | | | |
|---|---|---|---|
| 2,790,844 | 4/1957 | Neugebauer | 358/518 |
| 4,275,413 | 6/1981 | Sakamoto et al. | 358/80 |
| 4,488,808 | 12/1984 | Kato | 356/73 |
| 4,500,919 | 2/1985 | Schreiber | 358/78 |
| 5,107,332 | 4/1992 | Chan | 358/80 |
| 5,416,613 | 5/1995 | Rolleston et al. | 358/518 |
| 5,452,112 | * 9/1995 | Wan et al. | 358/504 |
| 5,471,324 | 11/1995 | Rolleston | 358/518 |
| 5,483,360 | 1/1996 | Rolleston et al. | 358/518 |
| 5,491,568 | 2/1996 | Wan | 358/518 |
| 5,508,826 | * 4/1996 | Lloyd | 358/501 |
| 5,528,386 | * 6/1996 | Rolleston et al. | 358/522 |
| 5,539,522 | 7/1996 | Yoshida | 358/296 |
| 5,581,376 | * 12/1996 | Harrington | 358/518 |
| 5,612,902 | 3/1997 | Stokes | 364/526 |
| 5,671,059 | 9/1997 | Vincent | 356/402 |
| 5,748,221 | 5/1998 | Castelli et al. | 347/232 |
| 5,760,913 | * 6/1998 | Falk | 358/504 |
| 5,963,244 | 10/1999 | Mestha et al. | 347/251 |

FOREIGN PATENT DOCUMENTS

| | | | |
|---|---|---|---|
| 4243885A1 | 6/1994 | (DE) | . |
| 625847A1 | * 9/1995 | (EP) | H04N/1/46 |
| 674429A2 | * 9/1995 | (EP) | H04N/1/60 |

OTHER PUBLICATIONS

"Printing CIELAB Images on a CMYK Printer Using Tri–Linear Interpolation", by Nin, Kasson, & Plouffe, IBM Almaden Research Center.

"Tetrahedral Division Technique Applied to Colorimetric Calibration for Imaging Media", by Hung, Electronic Imaging Laboratories, Kinica Corp., Japan, May, 1992.

"Colorimetric Calibration for Scanners and Media", by Hung, Konica Corporation.

* cited by examiner

Primary Examiner—Jerome Grant, II

(57) ABSTRACT

A method and apparatus for periodically upgrading the color calibration for an electrophotographic printer (or other digital document viewing device) using a color compensator is proposed. Initially, a fairly large number of colors are printed and measured. From this information a color correction is determined and stored in a high density compensator. A small number of color patch samples are printed and measured at regular intervals during the use of the printing machine. This low density information which is periodically updated compensates for slow drift in the high density compensator. Each time the small patch printing process is repeated a different set of colors is used to assure that all regions within the gamut of the machine are updated uniformly. A similar process can be used to maintain the gray scale fidelity in a black and white printer or digital document display device.

6 Claims, 2 Drawing Sheets

Figure 1:
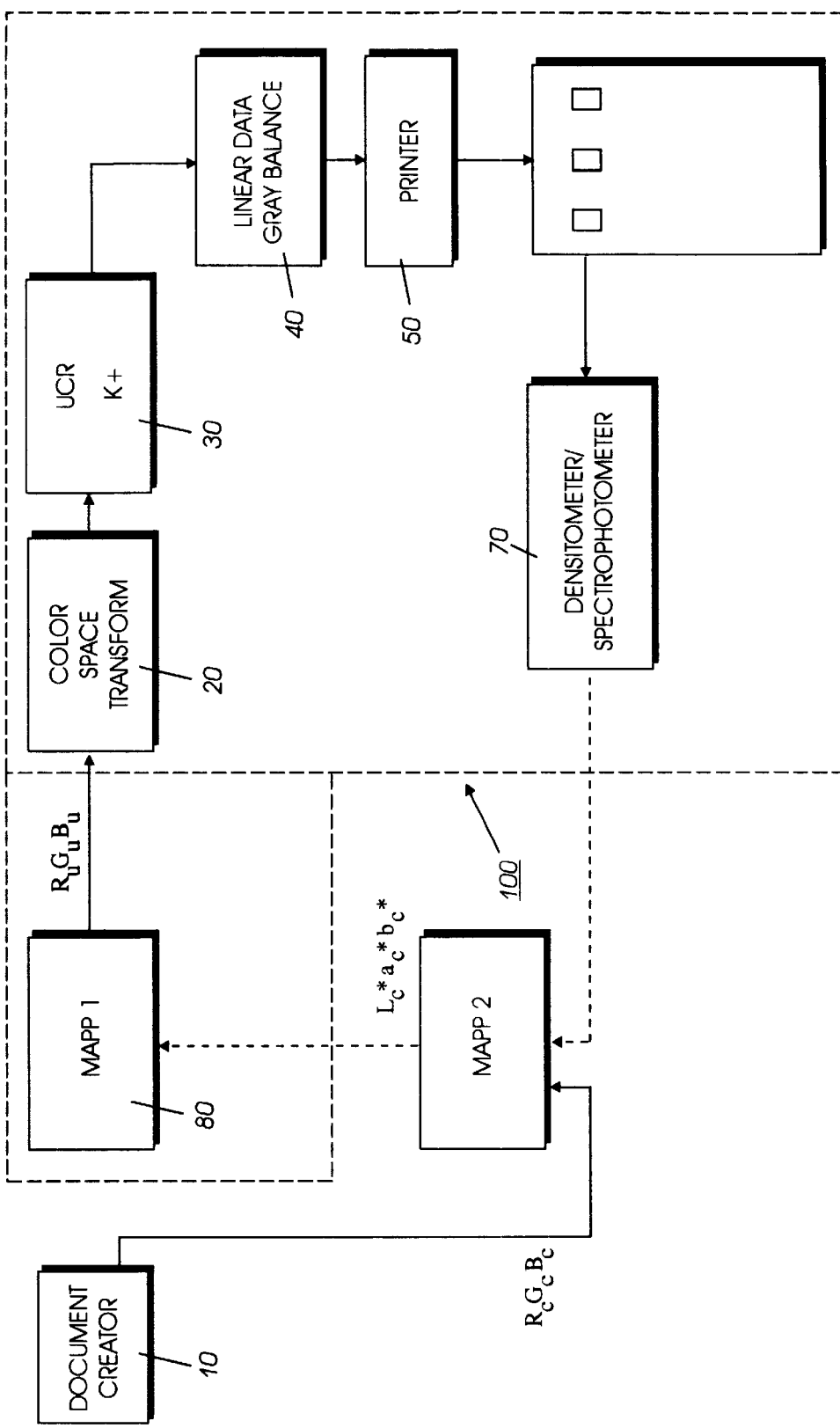

ON LINE COMPENSATION FOR SLOW DRIFT OF COLOR FIDELITY IN DOCUMENT OUTPUT TERMINALS (DOT)

Cross-reference is made to a commonly owned and co-pending application Ser. No. 08/786,010 filed on the same Jun. 27, 1997 date by Steven J. Harrington, and entitled "Method for Continuous Color Calibration for Color Document Output Terminals" (Attorney Docket No. D/96644), the EPO equivalent of which was published on Jul. 22, 1998 as EPO Publication No. 0 854 638 A2.

This invention describes a method and apparatus for calibrating, and periodically maintaining the calibration of, the colors printed by a document output terminal.

The following patents are specifically incorporated by reference: U.S. Pat. No. 5,416,613 to Rolleston et al. for its teaching of calibrating the response of a color printer by using a plurality of color patches some of which are repeated at a plurality of spatially disparate locations on the test image; U.S. Pat. No. 4,500,919 to Schreiber for its teachings of a color conversion system converting information from RGB to CMYK; U.S. Pat. No. 4,275,413 to Sakamoto for its teachings of tetrahedral interpolation between first and second color spaces; and U.S. Pat. No. 2,790,844 to Neugebauer disclosing the desirability of defining an image in a first standard color space prior to conversion of the image coordinates to a second printer based coordinate system.

The generation of color documents can be thought of as a two step process: first, the generation of the image by means of scanning an original document with a color image input terminal or scanner or, alternatively, creating a color image on a work station operated in accordance with a color image creation program; and secondly, printing of that image with a color printer in accordance with the colors defined by the scanner or computer generated image. Color corrected scanners commonly operate with colors defined in a color space of tristimulus values, e.g., RGB (red-green-blue). Commonly, these values are a linear transformation of the standard XYZ coordinates of CIE (International Commission on Lighting) color space, or a correct transform of those values. In the case of computer generated images, colors defined by the user at the user interface of his workstation are immediately converted into color space values and directed out of the system as defined in the document colors.

Printers have an output which can be defined as existing in a color space called CMYK (cyan, magenta, yellow, key or black) which is uniquely defined for the printer by its capabilities and colorants. Printers operate by the addition of multiple layers of ink or colorant in layers or halftone dots to a page. The response of the printer tends to be non-linear. Thus, while a printer receives information in a first color space which has values defined independently of any device, it must convert that information to print in a second device dependent color space.

The desirability of operating in a tristimulus color space with subsequent conversion to a printer colorant color space is well known, as shown by U.S. Pat. No. 4,500,919 to Schreiber, U.S. Pat. No. 2,790,844 to Neugebauer, and U.S. Pat. No. 4,275,413 to Sakamoto. There are many methods of conversion between color spaces, all of which begin with the measurement of printer response to certain input values. Commonly, a printer is driven with a set of color input values, the values are printed in normal operation of the printer, and measurements are made of those colors to determine what the actual color printed was in response to the color specification. As previously noted, most printers have non-linear response characteristics.

The calibration of a printer involves the process of finding what set of signals must be sent to a printer to obtain a desired color. The desired color is described in some device independent terminology (i.e., some well defined standard), and the signals to the printer constitute a device dependent terminology. A complete calibration will transform the device independent color description into a device dependent description such that the resultant combination of materials (i.e., ink, toner, dye, etc.) on the paper produces the desired color (i.e., the color which was initially described in a device independent fashion).

In U.S. Pat. No. 4,500,919 to Schreiber, and U.S. Pat. No. 4,275,413 to Sakamoto, the information derived from patch measuring was placed into look-up tables, stored in a memory, perhaps ROM memory or RAM memory where the look-up table relates input color space to output color space. The look-up table is commonly a three dimensional table since color space is three dimensional. With a scanner or computer, the RGB space can be defined as three dimensional with black at the origin of a three dimensional coordinate system (0,0,0), and white at the maximum of a three dimensional coordinate system which, in an 8-bit system, would be located at (255, 255, 255). Each of the three axes radiating from the origin point therefore respectively define red, green, and blue. A similar construct can be made for the printer, with axes representing cyan, magenta, and yellow. Black toner is usually added separately. In the 8-bit system suggested there will be, however, over 16 million possible colors ($256^3$) There are clearly too many values for a 1:1 mapping of RGB to CMYK. Accordingly, as proposed in U.S. Pat. No. 4,275,413 to Sakamoto, only a relatively small number of samples are made at the printer, perhaps on the order of 1,000, or even less. Therefore, the look-up tables consist of a set of values which could be said to be the intersections for corners of a set of rectangular parallelepipeds mounted on top of one another. Colors falling within each rectangular volume can be interpolated from the measured values, through many methods including tri-linear interpolation, tetrahedral interpolation, polynomial interpolation, linear interpolation, and any other interpolation method depending on the accuracy of the desired result.

A common approach to accomplishing calibration of a print system is by generating a set of color patches distributed in color space; printing the patches (in output color space) in a desired output medium like a paper sheet and measuring the color of the patches, typically with a high accuracy densitometer, spectrophotometer or the like to determine what was printed in terms of an input color space. This data can then be loaded into a look-up table. However, it will undoubtedly be understood that due to the vast number of measurements required to perform such a calibration, any continual, automatic updating is considered impractical and generally not performed.

Other references which disclose calibration methods for color printers utilizing look up tables and interpolation schemes include U.S. Pat. No. 5,508,826 to Lloyd et al; U.S. Pat. No. 5,471,324 to Rolleston; U.S. Pat. No. 5,491,568 to Wan; U.S. Pat. No. 5,539,522 to Yoshida; U.S. Pat. No. 5,528,386 to Rolleston et al.; and U.S. Pat. No. 5,483,360 to Rolleston et al.

All of the references cited herein are incorporated by reference for their teachings.

In accordance with one aspect of the invention, there is provided a calibration arrangement for periodically updating the calibration of a color printer, comprising: a multi-color (or monochrome) printer responsive to electronic signals to print combinations of a plurality of colorants approximating cyan, magenta, yellow and black on a substrate, a memory suitable to store electronic signals suitable to drive the color printer to reproduce a calibration image, said calibration image including patches printed on said substrate with combinations of primary (e.g., cyan, magenta, yellow, and black or a system supplemented by orange and green colorants) subtractive colorants and representing known possible colors within a gamut of said printer, a printer controller, controlling the printer to print the calibration image during normal operations, a color sensing device suitable for measuring the colorimetric response of the printer in printing the calibration image on the substrate in terms of device independent colorimetrics, a device memory storing a look-up table relating device independent colors to printer colorants derived from the colorimetric measurements of the printer response, a first compensator to convert device independent color information to calibrated device independent color information, as a function of the measured colorimetric response and a second compensator to update values in said first compensator on a periodic basis.

Pursuant to another aspect of the invention there is provided a method of updating the calibration of a color printer, comprising:

a.) measuring a plurality of color patches corresponding to desired output colors;

b.) determining a correction value for the desired patches as a function of the said measured color patch and the desired color output;

c.) periodically measuring subsets of the said color patches and using this information to update the said correction value.

Figure 2:
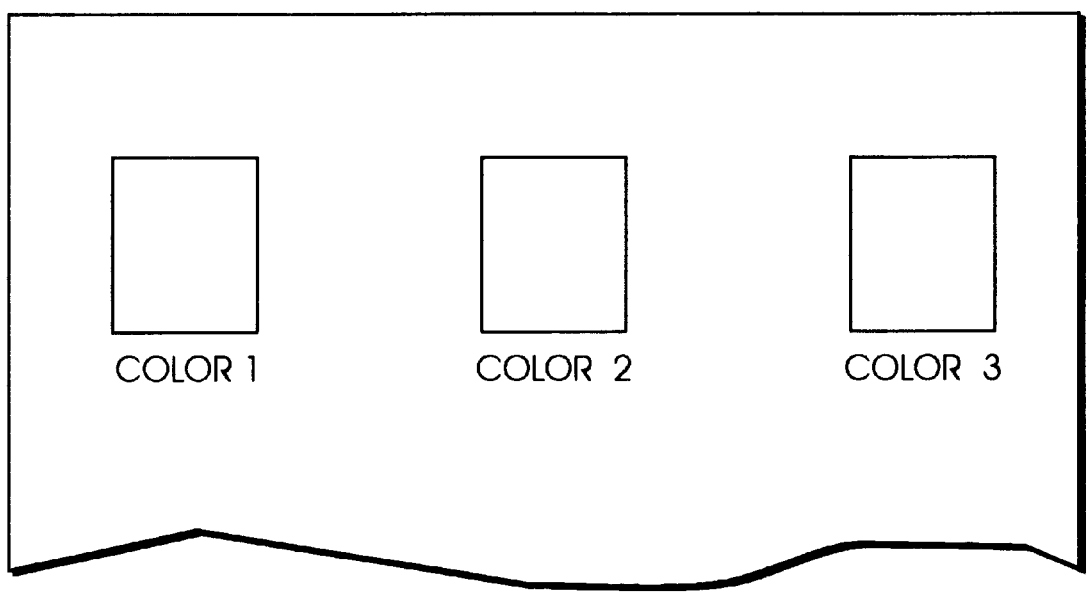

These and other aspects of the invention will become apparent from the following descriptions to illustrate a preferred embodiment of the invention read in conjunction with the accompanying drawings in which:

FIG. 1 is a block diagram of a printing system with color transformation, for converting device independent image descriptions to device dependent image descriptions; and FIG. 2 is a simplified illustration of a calibration test target in accordance with the invention.

Referring now to the drawings where the illustrations are for the purpose of describing an embodiment of the invention and not for limiting some, a basic system for carrying out the present invention is shown in FIG. 1. Generally, a source of images, in this case shown as a computer workstation or document creator 10 provides an image defined in colorimetric terms, typically digital in nature $R_c$, $G_c$, $B_c$. Commonly this description may be part of a Page Description Language (PDL) file describing the document in device independent terms. The colorimetric terms may reference CIE color space (L*a*b* for example), colorimetric RGB, luminance-chrominance space (L*c*h*), etc. A color space transform, indicated by block 20, such as that described in U.S. Pat. No. 4,275,413 to Sakamoto, is used to convert the device independent data to device dependent data. The output of color space transform 20 is the image defined in terms of a device dependent space, or colorant values $C_x$, $M_x$, $Y_x$, $K_x$. Commonly, color space transform 20 is a look-up table, receiving as addresses or indexes device independent signals describing the image, and producing as a responsive output a device dependent signal. In an example 8 bit per pixel/separation system, over 16 million mappings would be required. Accordingly, coupled with the look-up table is an interpolation arrangement, such as described in U.S. Pat. No. 4,275,413 to Sakamoto, or in copending U.S. patent application Ser. No. 08/131,168, filed Oct. 4, 1993, entitled "Reduced Storage of Pre-Computed Difference Tables Used in Color Space Conversion" by R. Rolleston, which provides interpolated output colors as an interpolated function of the closest mapped output colors.

With reference again to FIG. 1, in the example system, upon obtaining device dependent colorant signals $C_x$, $M_x$, $Y_x$, undercolor removal and black addition (K+) is performed at UCR and K+30. Subsequent to black addition, at linearization and gray balance 40, the color values are linearized, so that linearly increasing values of colorants produce a linearly increasing colorimetric response. The linearization process is implemented via a set of look-up tables storing the responses of a set of patches generated at a set of input values, where a curve fitting routine is used to map the set of possible input responses to characterized output responses. Rather than linearizing the color values, so that linearly increasing values of colorants produce a linearly increasing colorimetric response, the color values may be gray balanced, so that equal amounts of color produce a neutral gray response at the printer. The gray balance process is also implemented via a set of look-up tables storing the responses of a set of patches generated at a set of input values, where a curve fitting routine is used to map the set of possible input responses to characterized output responses. Whichever system is used, the new values $C_p$, $M_p$, $Y_p$, $K_p$ are then used to drive printer 50.

In one possible example, the colorant values represent the relative amounts of cyan, magenta, yellow and black toners that are to be deposited over a given area in an electrophotographic printer, such as the Xerox 4700 digital color printer. The printed output image may be said to be defined in terms of $R_p$, $G_p$, $B_p$, which is hoped to have a relationship with $R_c$, $G_c$, $B_c$, such that the printed image has a color that is colorimetrically similar to the original image, although similarity is ultimately dependent upon the gamut of the printing device.

It will no doubt be recognized that there are many methods of providing a transform from device independent data to device dependent data, with U.S. Pat. No. 4,275,413 to Sakamoto describing one method, which itself can be varied. Once a conversion table is established, a method of interpolation referred to as tri-linear or cubic interpolation may also be used to calculate output values from the limited set of input values. The values stored in the look-up table can be empirically derived, as in Sakamoto, or calculated or extrapolated based on empirical information, as in Po-Chieh Hung, "Tetrahedral Division Technique Applied to Colorimetric Calibration for Imaging Media", Annual Meeting IS&T, NJ, May, 1992 pp. 419–422; Po-Chieh Hung, "Colorimetric Calibration for Scanners and Media", SPIE, Vol. 1448, Camera and Input Scanner System, (1991); and Sigfredo I. Nin, et al., "Printing CIELAB Images on a CMYK Printer Using Tri-Linear Interpolation", SPIE Proceedings, Vol. 1670, 1992, pp. 316–324.

As discussed above, modern color printers often receive color specifications in a device independent format. The printer must then convert these color specifications into amounts of colorants to use in order to produce the desired color. Because printers are typically non linear in their behavior, a color look up table and interpolation is often used to find the colorant amounts for a desired color value. The look-up tables typically employ and 8×8×x8 (512 grid points) or a 16×16×16 (4096 grid points). The process of determining the proper table entries for the printer is known as color calibration. It is typically a fairly involved process requiring the printing and measuring of hundreds or thousands of color patches, and the interpolation of the measured values to determine color table entries. As the process is involved and normally requires human intervention, color recalibration is only rarely performed. Printer behavior can drift over time and color table values can become inappropriate causing significant color errors before the user is willing to make the effort of recalibration.

It would be desirable for the printer to adjust itself without computing new entries for the 8×8×8 table used in this example and without human intervention. This way it could regularly adjust for any drift in the machine behavior and always produce correct colors.

The essence of the invention is now presented:

To facilitate the description of the essence of the invention it will be assumed that a color can be described by a single coordinate; rather than 3 coordinates like L*a*b*.

If a printer is perfect a plot of requested color versus printed color would be a straight line passing through the origin and having a slope equal to 1. If a printer is not perfect, errors in printer performance appear as variations about that line.

To correct printer error, compensation may be placed between the device that requires the color to be printed and the printer itself. That is, the request would be fed to a compensation device which maps it into the color request that is sent to the printer. This request to the printer, if properly chosen, will cause the printer to print the originally requested color. The number of data points (i. e. the data density) required to describe the mapping depends on the printer's behavior. As the magnitude and frequency of the variations mentioned in the above paragraph increase, the data density must be increased to maintain the same level of color fidelity. To follow drift in a printer's behavior the mapping requires periodic updating. It is not practical, however, to update many data points with an on-line calibration system. A stationary feedback sensor looking at outcoming sheets would preferably sense a single row of test patterns as opposed to a two dimensional array of them. Producing many sheets of test patches for the purpose of calibration and/or compensation reduces printer productivity and tests the user's patience.

To overcome the above difficulty, consider the following:

Treat the printer plus compensator as a single system and think of that system as the printer. To differentiate it from the original physical printer call it the extended printer.

Now apply the above comments to the extended printer. That is, place compensation between the color requested and the extended printer.

Since the color fidelity of the extended printer is better than that of the original physical printer, the data density required for its compensation will be less than the data density required for original compensation. Therefore, it is a better candidate for periodic update.

A more detailed description of the invention is now presented:

Let color be described in some set of coordinates, like L*a*b*, and for purposes of explanation, refer to the compensator mapping for the physical printer as MAP1 and the compensator mapping for the extended printer as MAP2. The calibration procedure is implemented as follows: select a high density set of L*a*b* grid points that span the physical printer color gamut.

Construct MAP1 by experimentally determining the mapping from requested L*a*b* to printed L*a*b*. This is done by requesting color patches to be printed at each grid point and measuring the colorimetric coordinates of each printed patch. This is done on-line and is done only one time. To make this discrete mapping continuous, that is, to map non-grid points, any appropriate interpolation scheme as described and referenced above may be used.

Next, select a low density set of L*a*b* grid points. The selection of these points is discussed below.

Construct MAP2 by experimentally determining the mapping from requested L*a*b* (i.e., requests sent to the extended printer) to printed L*a*b*. This is done by requesting color patches to be printed at each of the low density grid points and measuring the coordinates of each printed patch. This mapping is updated periodically and is done on-line. To make this discrete mapping continuous, so as to map non-grid points, any appropriate interpolation scheme may be used.

The low density grid points are a subset of the grid points in the high density set. A number of different subsets, whose intersection is empty and whose union is the original MAP1 set, are used for this purpose.

During operation of the printer, when a request for a color arrives the following events take place:

1) An L*a*b* request arrives at the low density compensation device. Using MAP2 this request is converted into L*a*b* coordinates that are sent as requests to the extended printer.
2) This L*a*b* request arrives at the high density compensation device that is within the extended printer. Using MAP1 this request is converted into L*a*b* coordinates that are requested at the physical printer.
3) The requested color is then printed.

The periodic color upgrading device has been described in the context of a full color electrophotographic printing machine. The device is equally suitable for use as a stand alone color calibration upgrade in combination with a printer or for use in other types of printers (i.e., ink jet, liquid ink, thermal transfer) or other digital document display devices such as monitors.

Additionally, a similar scheme can be used to maintain the proper gray scale output for a black and white printing or digital document display device. A sensor can measure, for example, the L* (also a*b*) colorimetric coordinates or percent area coverage for a range of target output images. These coordinates can be used to update gray scale coordinates in a similar manner as described above. Of course it will be recognized that there is a need for many fewer test patches and readings in the black and white context due to the lesser number of possible combinations.

In recapitulation, there is provided a method and apparatus for periodically upgrading the color calibration for an electrophotographic printer (or other digital output device) using a color transform look up table stored in memory. Initially, a large number of color patch samples are printed, measured and stored as a map in a what is referred to as the high density compensator (i.e., MAP1). At regular intervals during the use of the printer, or whenever it is convenient, a small subset of the color patch samples are printed, measured and stored as a map in what is referred to as the low density compensator (i.e., MAP2). The subset changes each time this process is invoked. The low density compensator provides a correction for the high density compensator; together they provide color calibration and compensation for slow drift of the printer. The updating of MAP2 can occur on a scheduled, on-demand, or automated basis as desired.

It is, therefore, apparent that there has been provided in accordance with the present invention, a color calibration and compensation method and device that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. In a method of improving color printing accuracy of a plural color printer in which multiple print substrate sheets are plural color image printed and outputted by said plural color printer in normal printer operation color printing runs from an input of electronic color images and a color correction table system for said plural color printer, wherein said color correction table system requires a large number of color correction inputs for an initial full calibration of said color correction table system, the improvement comprising:

an on-line color re-calibration method by which said plural color printer automatically adjusts itself without human intervention and without substantially reducing printing productivity during said color printing runs to correct for color drift or other undesired changes in the accuracy of the colors being printed by said plural color printer on said print substrate sheets, said on-line color re-calibration method comprising;

regularly automatically printing on said same plural color printer during a said color printing run thereof a relatively small number of print substrate test sheets as output medium with a row of plural different color printed test patches on respective said test sheets, to provide a small subset of color patch samples, automatically reading said small subset of color patch samples on said small number of test sheets during said color printing run with a stationary on-line color spectrophotometer feedback sensor looking at outcoming sheets from said same plural color printer, to provide color re-calibration signals, and partially re-calibrating a part of said color correction table system with said color re-calibration signals from said stationary on-line color spectrophotometer feedback sensor readings of said small subset of color patch samples on said small number of print substrate test sheets printed during said color printing run, wherein the number of said color test patches in said small subset of color patch samples printed during said color printing run is very much smaller than said large number of color correction inputs required for said initial full calibration of said color correction table system.

2. The method of improving color printing accuracy of claim 1, wherein said partial re-calibration of a part of said color correction table system occurs during said same color printing run.

3. The method of improving color printing accuracy of claim 1, wherein during subsequent said color printing runs additional small numbers of print substrate test sheets are printed as output medium with additional plural different color printed test patches on respective said additional test sheets, to provide additional said small subsets of color patch samples with different colors from the previous said small subset of color patch samples.

4. The method of improving color printing accuracy of claim 1, wherein said color re-calibration signals from said stationary on-line color spectrophotometer feedback sensor readings of said test patches on said small number of print substrate test sheets printed during said color printing run are stored as a map in a low density compensator and used to provide a correction to a high density compensator to update values in said high density compensator on a periodic basis, which high density compensator is part of said color correction table system.

5. The method of improving color printing accuracy of claim 1, wherein said input of electronic color images to said plural color printer is in a device independent color format and there is provided a color transformation to device dependent image descriptions.

6. The method of improving color printing accuracy of claim 1, wherein said stationary on-line color spectrophotometer feedback sensor looking at outcoming sheets from said same plural color printer measures the gray scale coordinates of the printed output of the printer in terms of percent area coverage or L* colorimetric coordinate;

and wherein a plural stage compensator periodically partially adjusts the printed output of the printer based on said measured percent area coverage or L* colorimetric coordinate to maintain gray scale fidelity during normal printing operations, wherein said partial adjustment of said output is less than a full update of gray scale calibration values for said printer.

* * * * *